United States Patent Office 2,928,828
Patented Mar. 15, 1960

2,928,828

ACYLATION OF HYDROXY COMPOUNDS WITH VINYL ESTERS

Clifford E. Smith and John V. Tuschhoff, Decatur, Ill., assignors to A. E. Staley Manufacturing Company, Decatur, Ill., a corporation of Delaware No Drawing. Application July 22, 1957
Serial No. 673,132

16 Claims. (Cl. 260—234)

This invention relates to the acylation of hydroxy compounds. More particularly, it relates to the acylation of aliphatic hydroxy compounds with vinyl esters in aqueous media.

The conventional methods of acylating hydroxy compounds are based on reaction with an acid anhydride, or with an acid halide. In general, best results with acid anhydrides are obtained by conducting the reaction at an elevated temperature under anhydrous conditions in the presence of a dehydrating catalyst such as concentrated sulfuric acid or an acid-neutralizing catalyst such as pyridine. A typical reaction temperature is the boiling point of acetic anhydride, 140° C. Although the acid halides readily convert hydroxy compounds to the esters, they are seldom used for this purpose, because of their relative volatility, corrosiveness, and other objectionable properties.

The acylation of aliphatic hydroxy compounds with vinyl esters under anhydrous conditions is known. For example, United States Patents Nos. 2,342,612 and 2,355,970 disclose the acylation of secondary alcohols with vinyl esters, using lower alkyl tertiary amines as catalysts. As stated in both patents: "It is generally preferable that the tertiary amine catalyst used in the process of my invention be substantially anhydrous since the presence of water in the reaction may result in a loss of desired product due to hydrolysis."

We have unexpectedly discovered, contrary to prior art teaching, that vinyl esters can be used advantageously to acylate aliphatic hydroxy compounds in the presence of water.

Our discovery is particularly important in the acylation of solid water-soluble compounds which are substantially insoluble in the vinyl esters. By substantially insoluble, we mean less than 2%. Examples of such compounds are pentaerythritol, sorbitol, dextrose, sucrose, alpha methylglucoside, gum arabic, agar-agar, alginic acid, inulin, and starch.

Acylation of these substances in the dry solid state with a vinyl ester is slow and generally unsatisfactory unless the substance is very finely divided, a condition difficult to obtain except in the case of starch.

We have found that vinyl esters rapidly acylate the foregoing substances in water solution, provided the proper alkalinity of reaction medium is maintained, as explained later in more detail. Even though the vinyl ester and water solution of hydroxy compound are substantially immiscible, rapid mixing of the two liquid phases generates new liquid-liquid interfaces and thus promotes reaction.

As mentioned earlier, prior art recommends the absence of water during the acylation, because water, if present, will lower the yield in those cases where the product ester is easily hydrolyzed. We have discovered, however, that whenever water in the reaction mixture is a drawback, it can be overcome by conducting the reaction at low temperatures in the range of 0–10° C. We found, quite unexpectedly, that the alkaline transesterification of aliphatic hydroxy compounds with vinyl esters is slowed much less than the hydrolysis of either vinyl ester or the ester produced by a drop in reaction temperature. The important practical result of our discovery is to provide for the preparation of esters by a novel method unhampered by large inherent yield losses in those instances where the ester produced is unusually sensitive to hydrolysis.

The primary object of our invention is to provide a new and useful process for the acylation of aliphatic hydroxy compounds, namely, alkaline-catalyzed transesterification of the compound with vinyl ester, the hydroxy compound being dissolved or dispersed in water.

Another object of our invention is to provide an improved process for the vinyl ester acylation of solid water-soluble aliphatic hydroxy compounds insoluble in vinyl esters.

A further object of our invention is to provide a new acylation process of wide scope which eliminates the disadvantages associated with the conventional processes.

Other objects will be apparent from the following description of our invention.

The foregoing objects are attained in accordance with our invention by reacting vinyl esters with an alkaline aqueous solution or dispersion of the hydroxy compound.

In general, we have found that with respect to pH of the reaction mixture, best results are obtained within the range of 9–10. Useful reaction is obtained at any alkaline pH. In some instances, for example, where reaction is slower than usual in the preferred pH range, use of a higher pH frequently speeds up the reaction. Since the higher pH values promote ester hydrolysis, it is generally desirable to use them in combination with the lower reaction temperatures.

Any water soluble substance that is inert to the vinyl ester and sufficiently alkaline to keep the reaction pH within the desired limits is a satisfactory catalyst. Illustrative of suitable catalysts in our invention are the hydroxides and carbonates of the alkali metals, the lower alkyl tertiary amines, and the quaternary ammonium hydroxides. We have found the alkali metal carbonates and tertiary amines to be convenient because in general they buffer the reaction mixture within the satisfactory pH range.

The process of our invention may be carried out at any desired temperature compatible with the reactants used and the product claimed. Generally we have obtained satisfactory results by conducting the reaction at room temperature, i.e., in the neighborhood of 30° C. At times, it may be necessary to raise the temperature to speed up the reaction. We have successfully refluxed the reaction mixture at about 75° C. In the event the product is unusually sensitive to hydrolysis, we have found it desirable to lower the temperature, in some instances close to the freezing point of water.

The process of our invention is applicable to all aliphatic hydroxy compounds. As pointed out above, it has particular utility in the acylation of the solid water-soluble compounds which are insoluble in vinyl esters. It is generally more expedient to react the vinyl ester with the compounds in water solution than in the powdered state.

Our invention applies to the vinyl esters of aliphatic monocarboxylic acids in general. Vinyl esters of the lower molecular weight acids, such as vinyl formate, vinyl acetate, vinyl propionate, and the vinyl butyrates react rapidly with aliphatic hydroxy compounds in accordance with our invention, but useful reaction may also be obtained with vinyl stearate.

The following examples illustrate our invention.

Example 1

In a flask equipped with reflux condenser, heating mantle, and mechanical stirrer, was placed 46 grams of glycerine, 144 grams of vinyl acetate, 100 grams of water, and 12 grams of soda ash. Initial pH of the water phase was 10.6. The mixture was stirred rapidly for 15 minutes, during which time the temperature of the mixture rose from 90° F. to 118° F. Heat was applied from the mantle with continuous stirring, and in 15 minutes more the mixture was refluxing at 165° F. Stirring and refluxing were continued for 30 minutes. The reaction mixture was cooled to 100° F. At this point, the water phase pH had dropped to 8.6. After the mixture was neutralized to 6.8 pH with dilute sulfuric acid, the vinyl acetate phase was separated from the heavier water phase. The latter was extracted three times with fresh 100 ml. portions of ethyl ether and the combined extracts were dried over anhydrous magnesium sulfate. Seven grams of an oily extract remained after the ether was distilled from the extract under moderate vacuum at 100° C. This was added to the vinyl acetate phase which was fractionally distilled through a column at 22 mm. of mercury pressure. There was thus obtained 31 grams of a fraction boiling at 152–155 °C. (uncorrected) whose saponification number corresponded to 48.1% acetyl. The acetyl content of glycerin diacetate is 48.8%. Glycerine is an example of a polyhydric alcohol having both primary and secondary hydroxyl groups.

Example 2

In a flask equipped with heating mantle and mechanical stirrer was placed 68 grams of vinyl acetate, 60 grams of dextrose, 10 grams of sodium carbonate, and 100 grams of water. The mixture was warmed to 120° F. and stirred for a few minutes to dissolve the soda ash. At this point the pH of the mixture was 9.9 and its temperature was 120° F. It was then stirred vigorously for 30 minutes at 120° F. The pH dropped from 9.9 to 8.5. The reaction mixture was neutralized to 7.0 pH with dilute sulfuric acid and allowed to stand 15 minutes. The upper vinyl acetate layer was separated from the lower aqueous layer and dried over anhydrous magnesium sulfate. The aqueous layer was extracted three times with fresh 100 ml. portions of ether. The combined extracts were dried over anhydrous magnesium sulfate and distilled on a steam bath to remove the ether. The residue was added to the dried vinyl acetate layer and the mixture was heated on the steam bath at 100 mm. of mercury pressure to remove the vinyl acetate. There was thus obtained 18.5 grams of a heavy liquid, soluble in water, which had a saponification number corresponding to an acetyl content of 46.2%. The acetyl content of dextrose triacetate is 41.8%. Dextrose is a polyhydric alcohol having both a primary and secondary hydroxyl groups.

Example 3

A solution of 43 grams of sucrose and 11 grams of sodium carbonate in 100 ml. of water was stirred vigorously at 110° F. with 96 grams of vinyl acetate for 2 hours. During this time the mixture pH dropped from 9.9 to 8.5. The mixture was neutralized to 6.8 pH with dilute sulfuric acid and allowed to stand 14 minutes. The upper vinyl acetate layer was separated from the lower aqueous layer and dried over anhydrous magnesium sulfate. The aqueous layer was extracted three times with fresh 100 ml. portions of ether. The combined extracts were dried over anhydrous magnesium sulfate and distilled over a steam bath to remove ether. The residue was added to the dried vinyl acetate layer and the mixture distilled at 120° C. and 50 mm. of mercury pressure to remove vinyl acetate. The 12 grams of clear viscous liquid thus obtained had a saponification number corresponding to 36.1% acetyl. The acetyl content of sucrose tetraacetate is 32.9%. Sucrose, a polyhydric alcohol, has both primary and secondary alcohol groups.

Example 4

A solution of 62 grams of ethylene glycol and 15 grams of sodium carbonate in 100 mls. of water was stirred vigorously with 172 grams of vinyl acetate at 80–100° F. for 1.5 hours. The pH of the reaction mixture dropped from 10.8 to 8.5 during this time. The mixture was neutralized to 6.9 pH with dilute sulfuric acid and allowed to stand to permit separation of the two liquid phases. The upper vinyl acetate layer was decanted and dried over anhydrous magnesium sulfate. The lower water layer was extracted three times with fresh 100 ml. portions of ether and the combined extracts were dried with the same desiccant. Ether was stripped from the dried extract by distilling at 100° C. on a steam bath. Vinyl acetate was removed from the dried upper layer by distillation to a maximum temperature of 140° C. The two distillation residues were combined and distilled in an oil bath reaching a temperature of 235° C. Nearly all of the product distilled at an uncorrected temperature of 177–179° C., this fraction amounting to 41 grams. The saponification number of the product corresponded to an acetyl content of 45.6%. The acetyl content of ethylene glycol monoacetate is 41.2% and its corrected boiling point is 182° C. Ethylene glycol is an example of a polyhydric alcohol having two primary hydroxyl groups.

Example 5

A solution of 100 grams of spray dried corn sirup solids (21.7 D.E.) and 9 grams of soda ash in 80 grams of water was stirred vigorously for 30 minutes with 40 grams of vinyl acetate at 90–100° F. The mixture was neutralized to 6.8 pH with 5 N sulfuric acid and allowed to stand to permit separation of the two liquid phases. The upper vinyl acetate layer was decanted, dried over anhydrous magnesium sulfate, and distilled under reduced pressure at 100° C. to remove the vinyl acetate. The distillation residue (3 grams) was added to the aqueous layer, which was dialyzed against running water for 16 hours on a low porosity dialysis bag. On a dry substance basis, the contents of the dialysis bag had a saponification number corresponding to an acetyl content of 9.8%. Corn syrup solids are known to contain mono-, di- and higher saccharides which are polyhydric alcohols having both primary and secondary hydroxyl groups.

Example 6

A solution of 10 grams of potassium hydroxide in 100 grams of water was placed in a 300 ml. round bottom flask equipped with mechanical stirrer and surrounded by an ice bath. Thirty-seven grams of N-butyl alcohol was added to the flask, and the mixture was stirred until its temperature had dropped to 37° C. At this point, 106 grams of vinyl acetate was added with vigorous stirring and the stirring continued at 37° C. for 3 hours. The reaction mixture was neutralized to 6.8 pH with 5 N sulfuric acid and allowed to stand to permit separation of the two liquid phases. The upper organic layer was decanted, dried over anhydrous magnesium sulfate, and fractionally distilled. There was thus obtained 16.5 grams of a fraction boiling at 105–110° C. and containing 6.1% acetyl, 6.5 grams of a fraction boiling at 110–112° C. and containing 19.4% acetyl and 4.5 grams of a fraction boiling at 112–118° C. and containing 9.3% acetyl. The acetyl content of butyl acetate is 37.1%.

Example 7

A mixture of 100 grams of commercial corn starch, 150 grams of water, 9 grams of soda ash, and 30 grams of vinyl acetate was stirred vigorously in a flask for 45 minutes at room temperature (80–100° F.). The mixture was then neutralized to 7 pH with dilute sulfuric acid and the starch was filtered and washed. The wet cake was re-suspended in 100 mls. of water, and 9 grams of soda ash and 30 grams of vinyl acetate were added. The mixture was again stirred vigorously for 45 minutes at 80–

100° F., then neutralized to 7 pH with dilute sulfuric acid. The recovered and washed starch was treated three more times with vinyl acetate and catalyst, for a total of 150 grams of vinyl acetate and 45 grams of soda ash. The final product, a granular starch superficially indistinguishable from the starting material, contained 25.1% acetyl on a dry substance basis. Starch is a carbohydrate, a complex polymer of anhydroglucose, and contains both primary and secondary hydroxyl groups.

*Example 8*

100 grams of commercial granular corn starch (12% moisture) was slurried with a solution of 9 grams of soda ash in 150 grams of water at 100° F. in a 500 ml. round bottom flask equipped with a mechanical stirrer. To this slurry was added 30 grams of vinyl formate. The mixture was stirred vigorously at 90–110° F. for two hours, then neutralized to 6.8 pH with dilute sulfuric acid and filtered. The superficially unchanged starch was washed with water on the filter and air dried. It had a saponification number corresponding to a formyl content of 6.0% on a dry substance basis.

*Example 9*

This example illustrates the reaction of starch with vinyl propionate. The procedure was the same as set forth in Example 8 except that the 30 grams of vinyl formate was replaced with 35 grams of vinyl propionate. The treated starch had a saponification number corresponding to a propionyl content of 9.6% on a dry substance basis.

*Example 10*

The procedure of Example 9 was repeated except that the vinyl formate was replaced with 40 grams of vinyl butyrate. The treated starch analyzed for 12.1% butyryl on a dry substance basis.

*Example 11*

The procedure of Example 8 was repeated except that the vinyl formate was replaced with 60 grams of vinyl 2-ethyl hexoate and the soda ash with 6.5 grams of sodium hydroxide, the latter added according to the following schedule: 2.5 grams added at the start of the reaction and one gram per twenty minutes thereafter. The treated starch had a saponification number corresponding to a 2-ethyl hexoyl content of 20.2%.

We claim:
1. The process for the acylation of aliphatic hydroxy compounds which comprises reacting the vinyl ester of an aliphatic monocarboxylic acid with the hydroxy compound in water at a pH within the range of 7.5 to 12.5.
2. A process according to claim 1 in which the vinyl ester is vinyl formate.
3. A process according to claim 1 in which the vinyl ester is vinyl acetate.
4. A process according to claim 1 in which the vinyl ester is vinyl propionate.
5. A process according to claim 1 in which the vinyl ester is a vinyl butyrate.
6. The process for the acylation of those aliphatic hydroxy polyhydroxy compounds having at least one primary hydroxyl group which comprises reacting the polyhydroxy compound in water with the vinyl ester of an aliphatic monocarboxylic acid at a pH within the range of 7.5 to 12.5.
7. A process according to claim 6 in which the vinyl ester is vinyl formate.
8. A process according to claim 6 in which the vinyl ester is vinyl acetate.
9. A process according to claim 6 in which the vinyl ester is vinyl propionate.
10. A process according to claim 6 in which the vinyl ester is a vinyl butyrate.
11. The process comprising reacting the vinyl ester of an aliphatic monocarboxylic acid with a polyhydroxy compound in water at a pH within the range of 7.5 to 12.5, said compound being selected from the group consisting of sugars, starch, glycerol, and ethylene glycol.
12. The process of claim 11 in which the polyhydroxy compound is a sugar.
13. The process of claim 11 in which the polyhydroxy compound is corn syrup solids.
14. The process of claim 11 in which the polyhydroxy compound is glycerol.
15. The process of claim 11 in which the polyhydroxy compound is sucrose.
16. The process of claim 11 in which the polyhydroxy compound is dextrose.

References Cited in the file of this patent
UNITED STATES PATENTS

| | | |
|---|---|---|
| 2,342,613 | Hansley | Feb. 22, 1944 |
| 2,461,139 | Caldwell | Feb. 8, 1949 |

UNITED STATES PATENT OFFICE

CERTIFICATE OF CORRECTION

Patent No. 2,928,828 March 15, 1960

Clifford E. Smith et al.

It is hereby certified that error appears in the printed specification of the above numbered patent requiring correction and that the said Letters Patent should read as corrected below.

Column 4, line 50, for "N-butyl" read -- n-butyl --; lines 52 and 54, for "37° C.", each occurrence, read -- 37° F. --; column 6, line 15, strike out "hydroxy"; line 35, for the claim reference numeral "11" read -- 12 --.

Signed and sealed this 6th day of September 1960.

(SEAL)
Attest:

ERNEST W. SWIDER
Attesting Officer

ROBERT C. WATSON
Commissioner of Patents